(12) United States Patent
Bose et al.

(10) Patent No.: US 9,298,234 B2
(45) Date of Patent: Mar. 29, 2016

(54) DYNAMIC POWER DISTRIBUTION

(71) Applicant: International Business Machines Corporation, Armonk, NY (US)

(72) Inventors: Pradip Bose, Yorktown Heights, NY (US); Alper Buyuktosunoglu, White Plains, NY (US); Hans M. Jacobson, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 492 days.

(21) Appl. No.: 13/685,912

(22) Filed: Nov. 27, 2012

(65) Prior Publication Data

US 2014/0148927 A1 May 29, 2014

(51) Int. Cl.
*G05B 19/02* (2006.01)
*G06F 1/26* (2006.01)
*G06F 1/32* (2006.01)

(52) U.S. Cl.
CPC . *G06F 1/26* (2013.01); *G06F 1/324* (2013.01); *G06F 1/3296* (2013.01)

(58) Field of Classification Search
CPC ......... G05B 19/02; G06F 1/26; G06F 1/3296; G06F 1/324
See application file for complete search history.

(56) References Cited

U.S. PATENT DOCUMENTS

| | | | |
|---|---|---|---|
| 4,131,942 A * | 12/1978 | Gillett et al. | 714/22 |
| 5,886,422 A * | 3/1999 | Mills | 307/29 |
| 5,963,457 A | 10/1999 | Kanoi | |
| 6,967,416 B2 | 11/2005 | Clevenger et al. | |
| 7,154,722 B1 | 12/2006 | Stoupis | |
| 7,193,262 B2 | 3/2007 | Ho et al. | |
| 7,487,012 B2 * | 2/2009 | Bose et al. | 700/300 |
| 7,873,823 B2 * | 1/2011 | Shankar | 713/100 |
| 8,078,894 B1 * | 12/2011 | Ogami | 713/321 |
| 8,345,454 B1 * | 1/2013 | Krolak et al. | 363/71 |
| 2004/0044922 A1 | 3/2004 | Wu | |
| 2007/0033562 A1 * | 2/2007 | Correale et al. | 716/10 |
| 2007/0222578 A1 * | 9/2007 | Iwamura | 340/538 |
| 2008/0143491 A1 * | 6/2008 | Deaver | 340/310.11 |
| 2009/0085552 A1 * | 4/2009 | Franza et al. | 323/350 |
| 2009/0240449 A1 * | 9/2009 | Gibala et al. | 702/62 |
| 2012/0159210 A1 * | 6/2012 | Hosaka | 713/320 |
| 2012/0195355 A1 * | 8/2012 | El-Essawy et al. | 375/222 |
| 2014/0148961 A1 * | 5/2014 | Bose et al. | 700/286 |
| 2014/0281629 A1 * | 9/2014 | Bose et al. | 713/323 |

OTHER PUBLICATIONS

P. Bose, et al., "Power-Efficient, Reliable Microprocessor Archetectures: Modeling and Design Methods," Proceedings of the 20th Great Lakes Symposium on VLSI, GLSVLSI '10, 2010, pp. 299-304.

(Continued)

*Primary Examiner* — Ramesh Patel

(74) *Attorney, Agent, or Firm* — Cantor Colburn LLP

(57) ABSTRACT

According to one embodiment, a method for dynamically sharing power grids of a device includes providing power from a first power supply to a first power grid in a first component of the device. The method also includes providing power from a second power supply to a second power grid in a second component of the device and dynamically changing, by a controller, a state of a first switch that controls a sharing of power between the first power grid and the second power grid during a runtime of the device.

20 Claims, 7 Drawing Sheets

(56) References Cited

OTHER PUBLICATIONS

P. Emma, et al., "Opportunities and Challenges for 3D Systems and Their Design," IEEE Design & Test of Computers, vol. 26, Issue 5, Sep.-Oct. 2009, pp. 6-14.

S.K. Lim, et al., "Physical Design for 3D System on Package," IEEE Design & Test of Computers, vol. 22, Issue 6, Nov.-Dec. 2005, pp. 532-539.

U.S. Appl. No. 13/878,033, Non-Final Office Action, Date Filed: Mar. 16, 2013; Date Mailed: Oct. 29, 2015; 17 pages.

* cited by examiner

DYNAMIC POWER DISTRIBUTION

BACKGROUND

The present invention relates generally to electronic devices, such as semiconductor chips, and more particularly to dynamically controlling power grids for a device.

Devices, such as semiconductor chips, may receive power via a plurality of power supply inputs. In some cases, where two circuits share the same power supply, noise experienced on a power grid of a first circuit can adversely affect a power grid of the second circuit. In addition, certain actions may be prevented from occurring due to the power grid sharing (also referred to as "power sharing"), such as a voltage or frequency scaling of the power supplied to one of the circuits.

SUMMARY

According to one embodiment, a method for dynamically sharing power grids of a device includes providing power from a first power supply to a first power grid in a first component of the device. The method also includes providing power from a second power supply to a second power grid in a second component of the device and dynamically changing, by a controller, a state of a first switch that controls a sharing of power between the first power grid and the second power grid during a runtime of the device.

According to another embodiment, a method for dynamically sharing power grids of separate components of a device includes providing power to a first power grid in a first component, providing power to a second power grid in a second component and determining an operation mode for the first power grid or the second power grid. The method also includes determining a runtime parameter relating to power provided to the first power grid or relating to power provided to the second power grid and dynamically controlling a sharing of power between the first power grid and the second power grid based on logic in a controller and at least one of: the determined operation mode and the determined runtime parameter.

DETAILED DESCRIPTION

Figure 1:
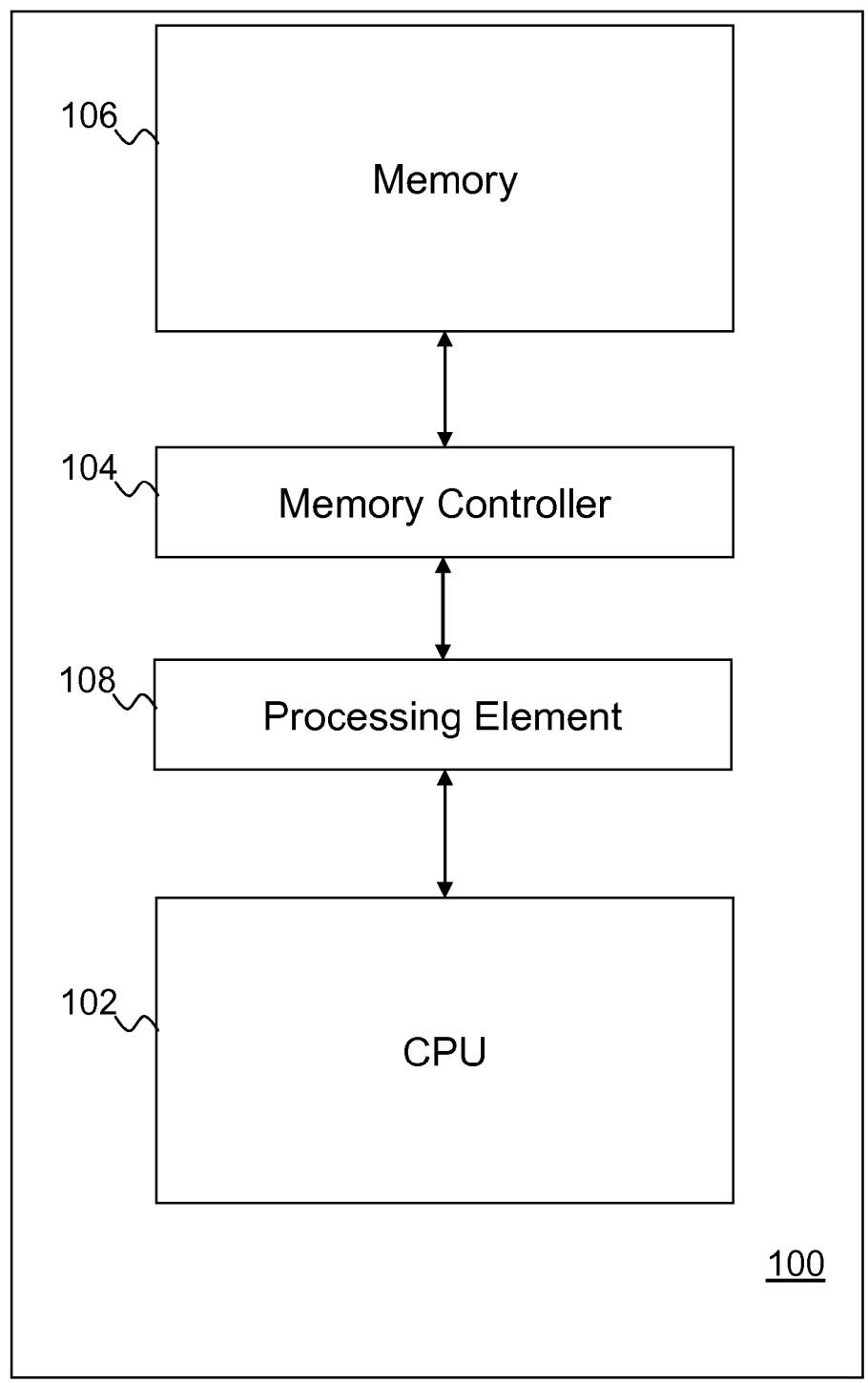
FIG. 1 illustrates a block diagram of a system for active buffered memory in accordance with an embodiment.

One embodiment of a device, such as a semiconductor chip, includes a plurality of power grids located in components located on one or more layers of the device. An example includes a power supply received by the device that includes a switch or gate and controller to dynamically share power grids between the two or more components while supporting individual dynamic power gating or dynamic voltage and frequency scaling of each component. In an embodiment, a structure of the device provides sharing of power grids between two or more components in the same layer (e.g., a layer of a 2D device) or in different layers (e.g., layers of a 3D device) of the devices. In one embodiment, the components that dynamically share power grids are circuits, such as processing cores or processing elements. In an embodiment, dynamically controlling the power grid sharing occurs during runtime for power grids in the device, such as during application runtime on a processor chip.

Embodiments include a controller, located in the device or coupled to the device, that is programmable and is configured to dynamically change and control connections between the power grids based on various factors, such as desired operation mode and sensed parameters relating to power in the device. In an embodiment, the power grid is dynamically shared across a stack of a 3D device. In one embodiment, connections are dynamically controlled between a plurality of internal points in a first power grid and a plurality of internal points in a second power grid. The system and method provide dynamical control over power grid sharing by providing reconfiguring of connections during runtime of circuit(s) in the device, such as during application runtime on a processor chip.

An embodiment is directed to a memory system including a memory device, such as a buffered memory device. The memory device may be any suitable memory device including one or more memory device (e.g., random access memory "RAM" chips) connected to a hub chip (also referred to as a memory controller chip) configured to control the memory device. In an embodiment, the buffered memory device includes layers of memory that form a three dimensional ("3D") memory device (also referred to as "memory cube") where individual columns of memory chips form stacks or vaults in communication with the hub chip. In one embodiment, a plurality of memory stacks are located on a memory module, where each stack has a respective hub chip. The hub chips may include a processing element configured to communicate with the memory and other processing elements in other hub chips. In an embodiment, a processing element accesses a selected address in a vault through an interconnect network. In one embodiment, a plurality of memory devices, stacks and processing elements may communicate via the interconnect network, such as a crossbar switch. In embodiments, a memory stack includes multiple DRAM dies stacked together, where each DRAM die is divided into a number of banks. Further, in the example, a group of banks in each die, vertically aligned, may be referred to as a vault accessed by a vault controller.

Embodiments include a memory stack with a processing element and memory controller in the hub chip, referred to as an active buffered memory device. The active buffered memory device can perform a complex set of operations using multiple locations (e.g., data stored at specific addresses) within the memory device as operands. A process is provided whereby instructions and operations are performed autonomously on these operands within the memory device. Instructions and operations may be stored within the memory device itself and are not dispatched from a main processor, wherein the stored instructions are provided to the processing elements for processing by the processing element in the memory device. In one embodiment, the processing elements are programmable engines, comprising an instruction buffer, an instruction unit, including branching capability and instruction decode, a mixture of vector, scalar, and mask register files, a plurality of load/store units for the movement of data between memory and the register files, and a plurality of execution units for the arithmetic and logical processing of various data types. Also included in the memory device are address translation capabilities for converting or translating virtual addresses to physical addresses, a unified Load/Store Queue to sequence data movement between the memory and the processing elements, and a processor communications unit, for communication with the main processor.

In an embodiment, the active buffered memory device is configured to load configuration information or instructions from a part of the active buffered memory device into a processing element following receiving a command from an external requestor, such as a main processor or another processing element. In addition, the processing element may perform virtual-to-real address translations that it computes while executing the loaded instructions.

In embodiments, it is desirable to have processing capabilities within an active buffered memory device to reduce memory latency and energy consumption that would be experienced when the memory is being accessed by a processor residing in a separate chip. Instead of bringing data from memory to the separate processing chip through lower bandwidth communication paths, performing what are often quite simple calculations on the data, and then transferring the processed data back to memory, the system's main processor configures the processing elements within the active buffered memory device, and then instructs them to carry out the data processing tasks. This may be achieved by sending one or more commands from the main processor to the device. In this scenario, the movement of data between the main processor and memory is greatly reduced, both in the distance it has to travel from the memory chips to the processor chip, and in the number of levels of cache that it has to traverse through the memory hierarchy.

FIG. 1 illustrates a block diagram of a system with a memory device accordance with an embodiment. A system 100 depicted in FIG. 1 includes a computer processor 102, a memory 106 having memory devices, as well as a memory controller 104 and processing element 108 for receiving data from the computer processor 102 to be stored in the memory 106. In an embodiment, the memory controller and processing element 108 may be referred to as a hub chip.

In one embodiment, the memory 106 and memory controller 104 is coupled to the computer processor 102 and processes write requests from the computer processor 102. In one example, the write requests contain data to be written to the memory 106 and a memory location of the instruction(s), where the instruction forms the virtual address for the data to be written. The memory controller 104 stores data at a real address within the memory 106. In another example, the computer processor 102 maps the virtual address to a real address in the memory 106 when storing or retrieving data. In the example, the write requests contain data to be written to the memory 106 and the real address identifying the location in the memory 106 to which the data will be written. The real address for a given logical address may change each time data in the memory 106 is modified.

In an embodiment, the command from the computer processor 106 specifies a sequence of instructions that include setup actions, execution actions and notification of completion actions. The setup actions may include configuration actions such as a command that loads configuration information from the memory within the memory device directly into the processing element 108. By providing the configuration information in the memory device, the processing element 108 is able to be properly configured after receiving a command. In an embodiment, configuration information may include information used to translate between virtual addresses and real addresses in the memory. Further, configuration information may include information to maintain coherence, by ensuring accuracy and consistency, of memory mapping and translation between the processing element and a requestor (e.g., main processor). The setup actions may also include the loading of code, such as a sequence of instructions, from the memory 106 into the processing element 108. The execution actions include execution of the code that includes load, store, arithmetic/logical and other instructions.

In an additional mode of an embodiment, the processing element 108 is coupled to the computer processor 102 and receives a command from the computer processor 102. The command corresponds to instructions stored in the memory to perform write requests for data to be written to the memory 106. In the embodiment, the instruction(s) executes and forms the virtual address corresponding to the write location in memory 106. The command may include a real address where the instruction(s) are stored. The memory controller 104 and/or processing element 108 stores data at a real address within the memory 106. In an embodiment, the processing element 108 maps the virtual address to a real address in the memory 106 when storing or retrieving data. The real address for a given logical address may change each time data in the memory 106 is modified. The computer processor 102 provides commands to the memory 106, where the processing element 108 receives the command and fetches corresponding instructions from the memory.

The system 100 is one example of a configuration that may be utilized to perform the processing described herein. Although the system 100 has been depicted with only a single memory 106, memory controller 104, processing element 108 and computer processor 102, it will be understood that other embodiments would also operate in other systems with two or more of the memory 106, memory controller 104, processing element 108 or computer processor 102. Further, embodiments may include fewer devices than depicted, such as a memory system with no processing element 108. In an embodiment, the memory 106, memory controller 104, processing element 108 and computer processor 102 are not located within the same computer. For example, the memory 106, processing element 108 and memory controller 104 may be located in one physical location (e.g., on a memory module) while the computer processor 102 is located in another physical location (e.g., the computer processor 102 accesses the memory controller 104 via a network). In addition, portions of the processing described herein may span one or more of the memory 106, memory controller 104, processing element 108 and computer processor 102.

Figure 2:
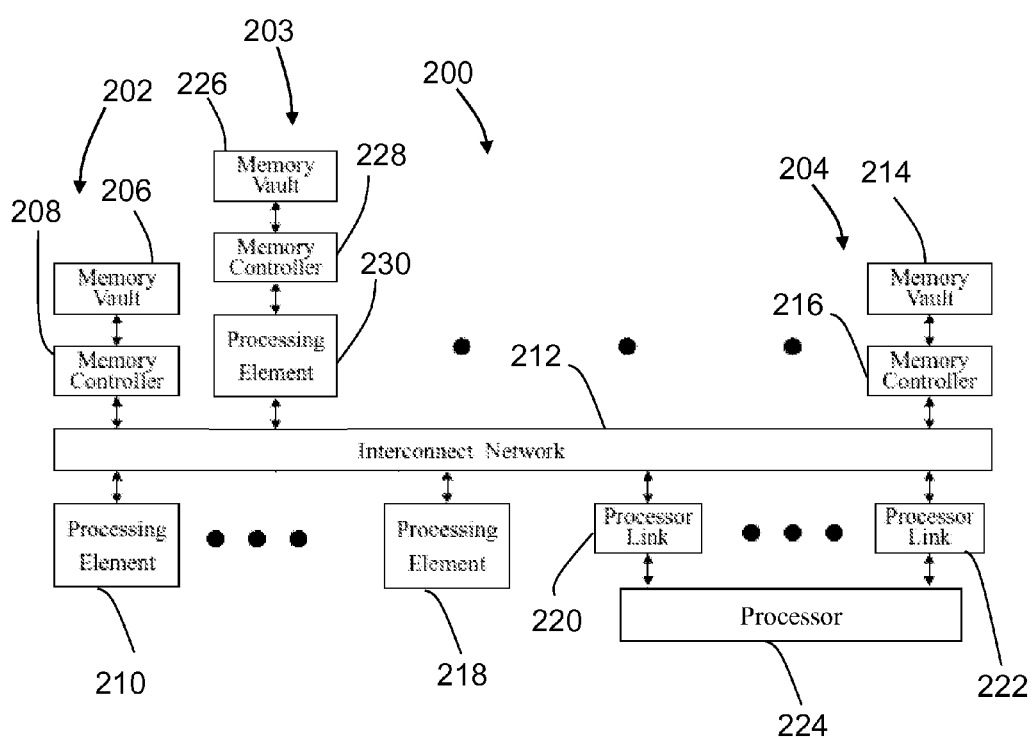
FIG. 2 illustrates a block diagram of a memory system with active buffered memory in accordance with an embodiment.

FIG. 2 is a schematic diagram of an embodiment of a computer system 200 implementing dynamic memory page management. In one embodiment, the computer system 200 includes an active buffered memory device 202, an active buffered memory device 203 and an active buffered memory device 204. The active buffered memory device 202 includes a memory vault 206, a memory controller 208 and a processing element 210. In an embodiment, the processing element 210, memory vault 206 and memory controller 208 are coupled and communicate via an interconnect network 212. Specifically, the processing element 210 communicates to the memory vault 206, memory controller 208 and other memory devices, such as active buffered memory devices 203 and 204, via the interconnect network 212. The interconnect network 212 is also coupled to a main processor 224 by processor links 220 and 222. The interconnect network 212 provides a fast and high bandwidth path for communication between portions of the device, such processing elements, memory controllers and memory, to provide improved performance and reduced latency for the active buffered memory.

The active buffered memory device 203 includes a memory vault 226, a memory controller 228 and a processing element 230. In an embodiment, the processing element 230, memory vault 226 and memory controller 228 are all located on the same side of the interconnect network 212, such as within a single stack. By positioning the processing element 230 in the same stack as memory vault 226, the latency is reduced when accessing locations in the memory vault 226, thus further improving performance. In one embodiment, the active buffered memory 204 includes a memory vault 214 and memory controller 216 coupled to processing elements 210 and processing element 218 via the interconnect network 212. As depicted, the processing element 218 is located on the other side of the interconnect network 212 from the memory controller 216 and memory vault 214. In embodiments, the active buffered memory devices 202, 203 and 204 include multiple layers of stacked addressable memory elements. Further, the stack's memory may be divided into memory vaults 206, 226 and 214, or three-dimensional blocked regions of the memory device which share a common memory controller and/or memory element, and are capable of servicing memory access requests to their domain of memory independently of one another.

In embodiments, the processing elements, memory vaults and memory controllers may be arranged in a suitable manner depending on the application. For example, one or more processing elements, such as processing element 218, may be positioned on one side of the interconnect network 212 and may operate as a pool of processing elements that are available for accessing any memory in the memory system coupled to the interconnect network 212. The pooled processing elements are not limited to accessing a particular memory vault and, thus, one or more elements may be utilized upon receiving a command from the main processor 224. Accordingly, processing element 218 may be configured to access each memory vault 206, 226 and 214. In another embodiment, one or more processing elements, such as processing element 230, is located as part of a stack including a memory vault 226 and memory controller 228. In such a configuration, the processing element 230 is configured to access memory vault 226 coupled to the interconnect network 212, including memory vaults 206 and 214. In one embodiment, one or more processing element, such as processing element 210, is positioned on an opposite side of the interconnect network 212 from the memory vault 206 and memory controller 208. In the configuration, the processing element 210 is configured to access any memory coupled to the interconnect network 212, including memory vaults 226 and 214.

Figure 3:
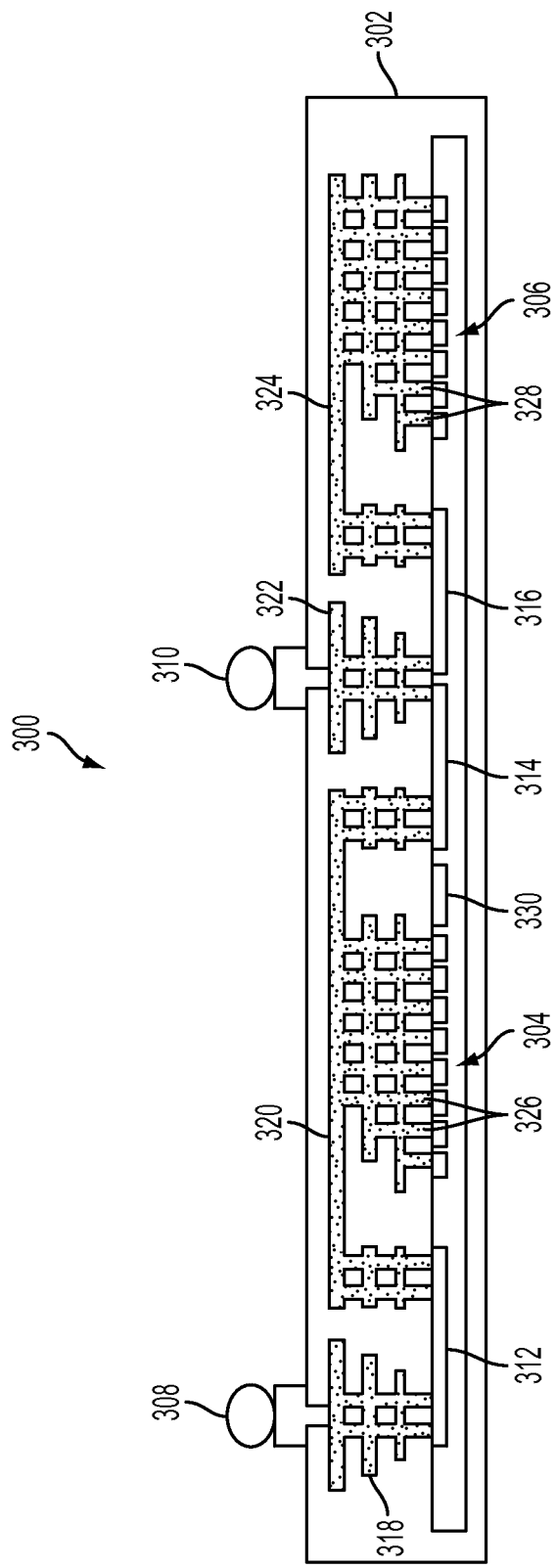
FIGS. 3-5 are block diagrams of devices with dynamic power grid sharing according to various embodiments.

FIG. 3 is a block diagram of a device 300 with dynamic power grid sharing according to an embodiment. In embodiments, the device 300 is an active memory device, such as those discussed above with reference to FIGS. 1 and 2. The device 300 may include memory and/or processing components (e.g., processing elements), such as the active buffered memory described above. As depicted, the device 300 includes a single layer 302 with a component 304 and a component 306. Power is provided at a power supply 308 and a power supply 310, where the power supplies may receive power from separate sources or from the same source, depending on the device 300 configuration. A power grid 326 in the component 304 directs received power to various internal points within the component 304. Similarly, a power grid 328 in the component 306 directs received power to various internal points within the component 306. A state of a switch 312 controls supply of power from the power supply 308 to the component 304. In an embodiment, when the switch 312 is closed, power is directed through wires 318 and 320 to the component 304. Accordingly, when the switch 312 is open, the power grid 326 is isolated or does not receive power from the power supply 308.

A state of a switch 316 controls supply of power from the power supply 310 to the power grid 328. In an embodiment, when the switch 316 is closed, power is directed through wires 322 and 324 to the component 306. Accordingly, when the switch 316 is open, power grid 328 is isolated or does not receive power from the power supply 310. A state of a switch 314 controls a sharing of power between the power grid 326 of component 304 and the power grid 328 of component 306. In an embodiment, a closed state for the switches 312, 314 and 316 shares power between the power grids 326 and 328, where the power that is shared is provided by both power supplies 308 and 310. In another embodiment, an open state for switch 312 and a closed state for the switches 314 and 316 shares power between the power grids 326 and 328, where the power is provided only by power supply 310. In an embodiment, an open state for switch 316 and a closed state for the switches 314 and 312 does not provide any power to power grid 328 while the power grid 326 receives power from both power supplies 308 and 310. In yet another embodiment, an open state for the switch 314 and a closed state for the switches 312 and 316 provides power from power supply 308 to power grid 326 and provides power from power supply 310 to power grid 328, where the power grids do not share power. In embodiments, the states of switches 312, 314 and 316 are controlled by a controller 330 based on several factors, such as operation modes of the power grids, runtime parameters relating to the power grids, logic in a controller and commands from a system manager (operating system or hypervisor).

Figure 4:
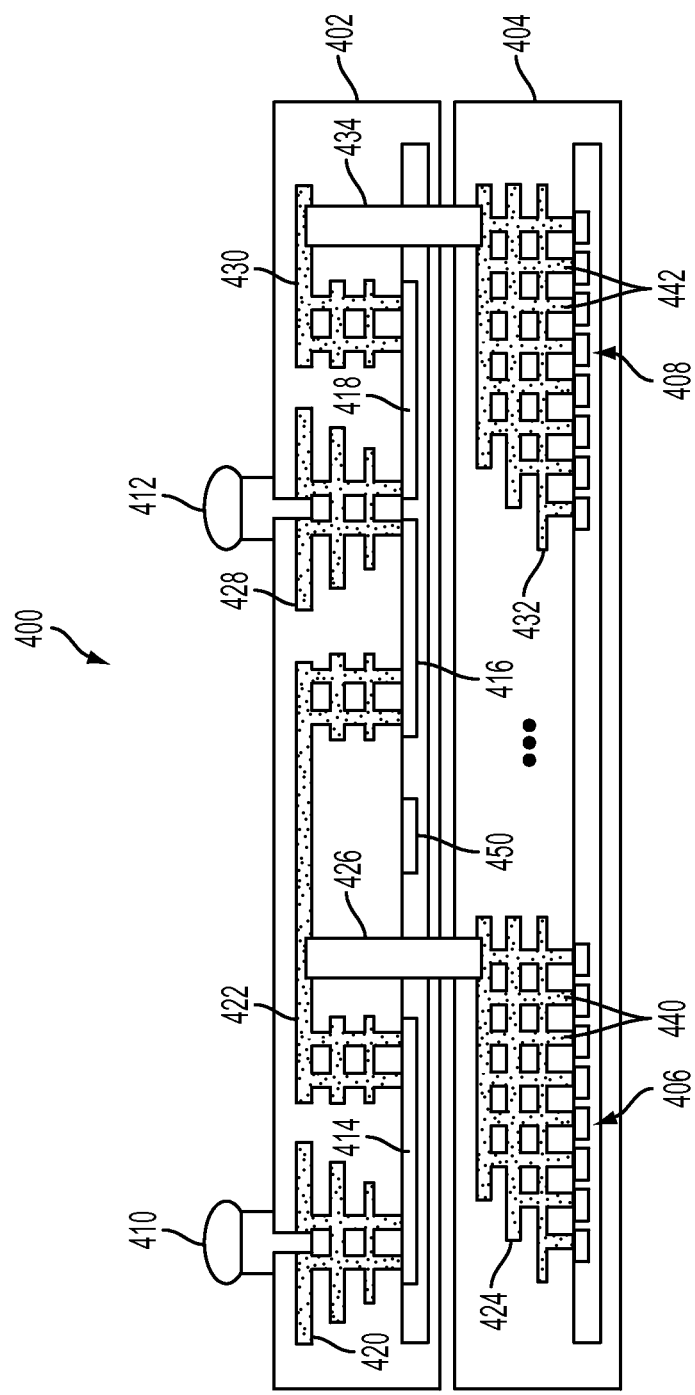

FIG. 4 is a block diagram of a device 400 with dynamic power grid sharing according to an embodiment. In embodiments, the device 400 is an active memory device, such as those discussed above with reference to FIGS. 1 and 2. The device 400 may include memory and/or processing components (e.g., processing elements), such as the active buffered memory described above. As depicted, the device 400 includes a layer 402 and a layer 404, where the layer 404 includes a component 406 and a component 408. Power is provided at a power supply 410 and a power supply 412, where the power supplies may receive power from separate sources or from the same source, depending on the device 400 configuration. A power grid 440 in the component 406 directs received power to various internal points within the component 406. Similarly, a power grid 442 in the component 408 directs received power to various internal points within the component 408. A state of a switch 414 controls supply of power from the power supply 410 to the component 406. In an embodiment, when the switch 414 is closed, power is directed through wires 420, 422, 424 and power via 426 to the component 406. Accordingly, when the switch 414 is open, the power grid 440 does not receive power from the power supply 410.

A state of a switch 418 controls supply of power from the power supply 412 to the power grid 442. In an embodiment, when the switch 418 is closed, power is directed through wires 428, 430, 432 and power via 434 to the component 408. Accordingly, when the switch 418 is open, power grid 442 does not receive power from the power supply 412. A state of a switch 416 controls a sharing of power between the power grid 440 of component 406 and the power grid 442 of component 408. In an embodiment, a closed state for the switches 414, 416 and 418 shares power between the power grids 440 and 442, where the power is provided by both power supplies 410 and 412. In another embodiment, an open state for switch 414 and a closed state for the switches 416 and 418 shares power between the power grids 440 and 442, where the power is provided only by power supply 412. In an embodiment, an open state for switch 418 and a closed state for the switches 414 and 416 does not provide any power to power grid 442 while the power grid 440 receives power from both power supplies 410 and 412. In yet another embodiment, an open state for the switch 416 and a closed state for the switches 414 and 418 provides power from power supply 410 to power grid 440 and power from power supply 412 to power grid 442, where the power grids do not share power. In embodiments, the states of switches 414, 416 and 418 are controlled by a controller 450 based on several factors, such as operation modes of the power grids, runtime parameters relating to the power grids, logic in a controller and commands from a system manager (operating system or hypervisor).

Figure 5:
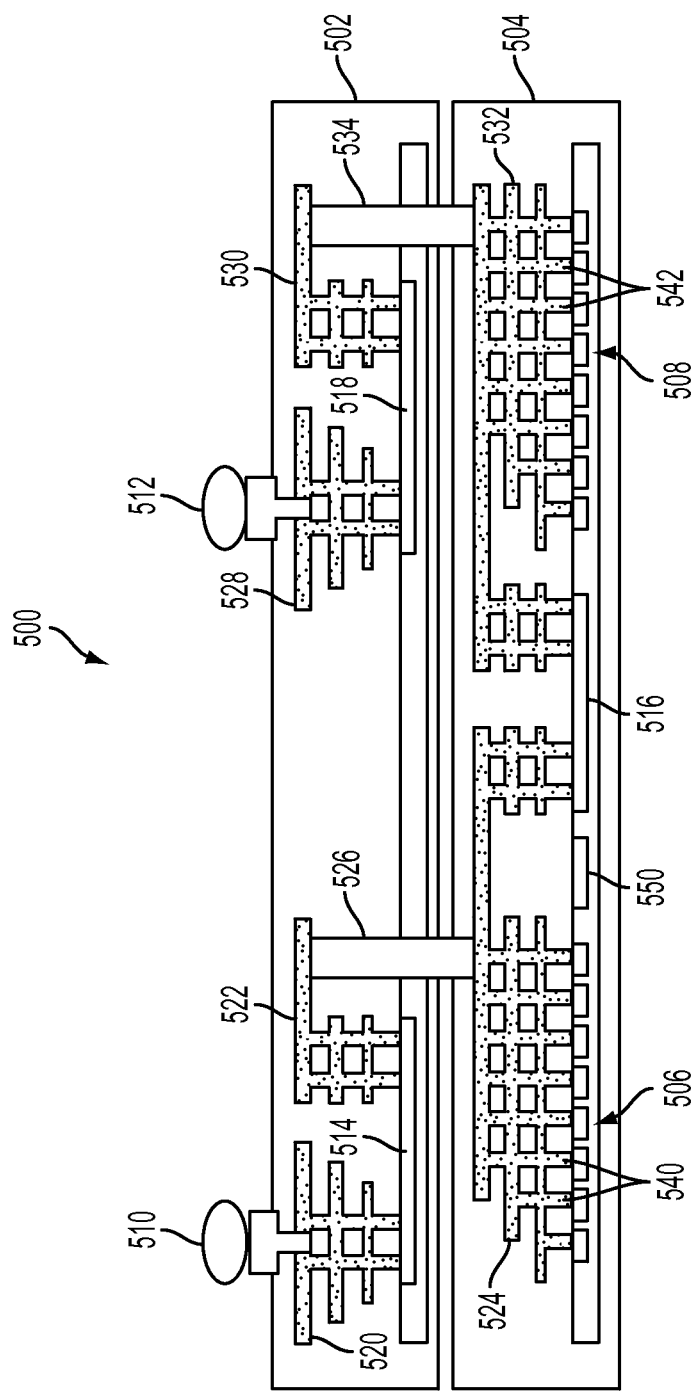

FIG. 5 is a block diagram of a device 500 with dynamic power grid sharing according to an embodiment. The device 500 may include memory and/or processing components (e.g., processing elements), such as the active buffered memory described above. As depicted, the device 500 includes a layer 502 and a layer 504. The layer 504 includes a component 506 and a component 508. Power is provided at a power supply 510 and a power supply 512, where the power supplies may receive power from separate sources or from the same source, depending on the device 500 configuration. A power grid 540 in the component 506 directs received power to various internal points within the component 506. Similarly, a power grid 542 in the component 508 directs received power to various internal points within the component 508. A state of a switch 514 controls supply of power from the power supply 510 to the component 506. In an embodiment, when the switch 514 is closed, power is directed through wires 520, 522, 524 and power via 526 to the component 506. Accordingly, when the switch 514 is open, the power grid 540 does not receive power from the power supply 510.

A state of a switch 518 controls supply of power from the power supply 512 to the power grid 542. In an embodiment, when the switch 518 is closed, power is directed through wires 528, 530, 532 and power via 534 to the component 508. Accordingly, when the switch 518 is open, power grid 542 does not receive power from the power supply 512. However, in the example, the power grid 542 may receive power from power supply 510 through wires 520, 522, 524, 532 and power via 526 if switches 514 and 516 are closed. A state of a switch 516 controls a sharing of power between the power grid 540 of component 506 and the power grid 542 of component 508. In an embodiment, a closed state for the switches 514, 516 and 518 shares power between the power grids 540 and 542, where the power is provided by both power supplies 510 and 512. In another embodiment, an open state for switch 514 and a closed state for the switches 516 and 518 shares power between the power grids 540 and 542, where the power is provided only by power supply 512. In yet another embodiment, an open state for the switch 516 and a closed state for the switches 514 and 518 provides power from power supply 510 to power grid 540 and power from power supply 512 to power grid 542, where the power grids do not share power. In embodiments, the states of switches 514, 516 and 518 may be controlled by a controller 550 based on several factors, such as operation modes of the power grids, runtime parameters relating to the power grids, logic in a controller and commands from a system manager (operating system or hypervisor).

In an embodiment, runtime parameters that are determined (e.g., sensed by a sensor) include, but are not limited to, voltages provided to the power grids, temperatures of the circuits, critical path delays of the circuits, currents of the power grids, power of the circuits, noise of the power grids, and soft-error rates or hard-error rates of the circuits. In an embodiment, operation modes include, but are not limited to, turbo modes for the components supplied by the power grids, reliability modes for the components supplied by the power grids, noise modes for the power grids, dynamic power gating for the power grids, dynamic voltage scaling for the power grids and dynamic frequency scaling for the components supplied by the power grids.

In embodiments, the power supplies are selectively connected by switches to selected wires and corresponding power grids in the device. The switch states are controlled by controllers based on selected factors or inputs. The switches enable connection of various power grids of components based on constraints such as activity, noise and current density. In an embodiment where the switches disable power grid sharing, the configuration enables circuits in components to run at different frequencies and/or voltages to save power and reduce thermal hotspots.

In an embodiment where the switches enable power grid sharing, components can share grid capacitance to reduce noise while additional power supply paths reduce current density in header switches (e.g., switch 312) used for dynamic power gating and dynamic voltage scaling. Power grid sharing can also reduce current density through the chip package pins and associated vias. In addition, power grid sharing can reduce through-silicon via current density if the power grid sharing switch (e.g., switch 516) is located on the bottom layer of a multi-layer device. Power grid sharing between power grids may also improve a turbo mode frequency operation mode for one of the components by providing reduced grid noise, improved power distribution and reduced via and switch stress.

Figure 6:
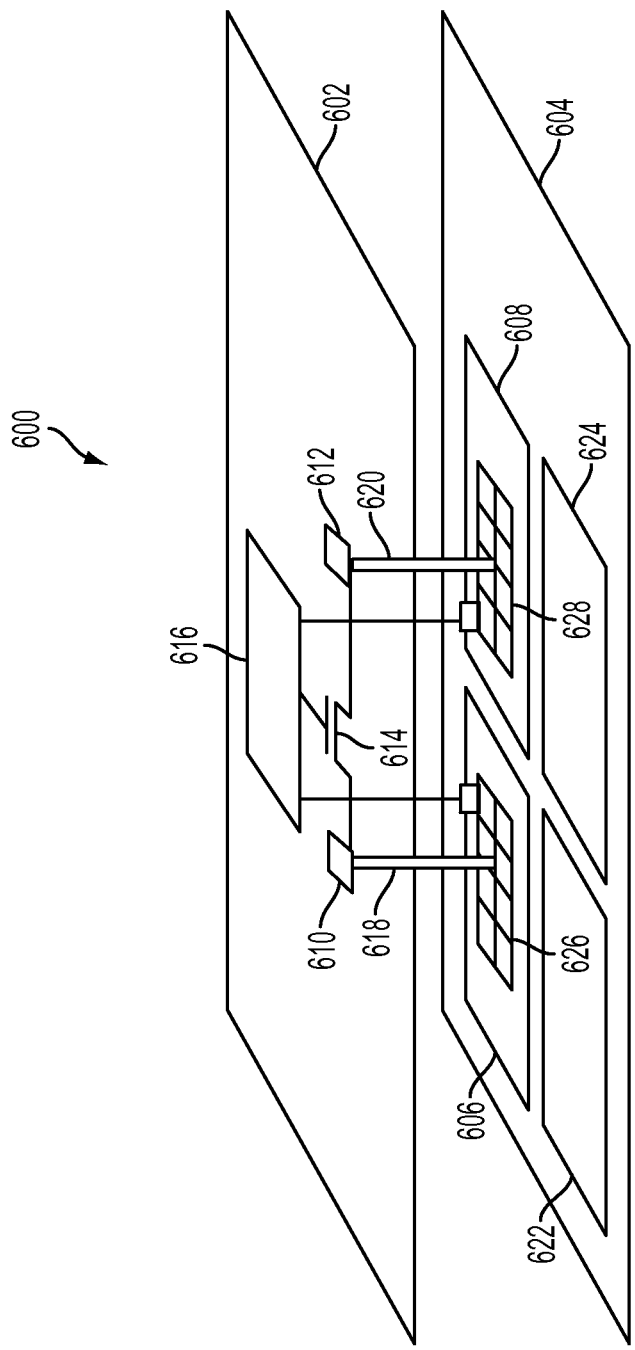
FIGS. 6 and 7 are schematic diagrams of devices with dynamic power grid sharing according to various embodiments.

FIG. 6 is a schematic diagram of a device 600 with dynamic power grid sharing according to an embodiment. The device 600 may include memory and/or processing components, such as the active buffered memory described above. As depicted, the device 600 includes a layer 602 and a layer 604 including components 606, 608, 622 and 624. Power is provided at a power supply 610 and a power supply 612, where the power supplies may receive power from separate sources or from the same source, depending on the device 600 configuration. A power grid 626 in the component 606 directs received power to various internal points within the component 606. Similarly, a power grid 628 in the component 608 directs received power to various internal points within the component 608. A state of a switch 614 controls a sharing of power between power grid 626 and power grid 628. In an embodiment, when the switch 614 is closed, power is directed through power vias 618 and 620 to the power grids 626 and 628. Accordingly, when the switch 614 is open, the power grid 626 only receives power from power supply 610 while the power grid 628 only receives power from power supply 612. As discussed above, the states of the switch 614 may be controlled by a controller 616 based on several factors, such as operation modes of the power grids, runtime parameters relating to the power grids, logic in a controller and commands from a system manager (operating system or hypervisor). The controller 616 may be any suitable controller with logic and/or software to control power grid sharing. Exemplary controllers include, but are not limited to, state machines, processing elements and processor cores. Control logic in the controller 616 may be programmable and/or configurable, where the logic may be self-contained or may receive inputs from management system software.

In an embodiment, a configuration of the controller 616 is controlled by a management system (e.g., hypervisor or operating system) and/or feedback from on-chip sensors to provide best performance and reliability under different runtime conditions and operation modes. Based on sensor feedback, the controller determines power-grid sharing for adjacent components that best supports the operation mode of the components. For example, if component 606 is in a reliability operation mode and an application running on component 606 causes low grid-noise and adjacent component 608 has high grid-noise then power grid sharing is disabled by opening switch 614. In another example, while component 606 is in a reliability mode, if component 606 has high noise and component 608 low noise then power grid sharing is enabled to reduce noise on component 606 for better reliability. An embodiment of a hard-error reliability mode is to reduce the stress on vias and power gating switches by sharing power grids and thereby reducing the current that flows through the vias and switches, improving long term reliability as hard errors (for example through electromigration) may take longer to occur. An embodiment of a soft-error reliability mode is to operate the component at a higher voltage, enabled without unduly stressing the vias and switches by sharing power grids, which improves the components resilience against soft-errors. In an example where the component 606 is in a turbo operation mode and an application on component 608 has low power requirements then power grid sharing is enabled to improve current supply to component 606. Alternatively, if component 606 is in turbo mode and component 608 has high power requirements, then power grid sharing is disabled. An embodiment of a turbo mode is a mode to increase the voltage and/or frequency at which a component operates in order to improve its performance. In addition, if component 606 is in a dynamic frequency and/or voltage scaling mode, power grid sharing can be disabled to prevent the scaling from adversely affecting operation of component 608. As shown above in FIGS. 3-6, various configurations of switches, wires and components can be controlled by a controller to provide power grid sharing based on several factors.

Figure 7:
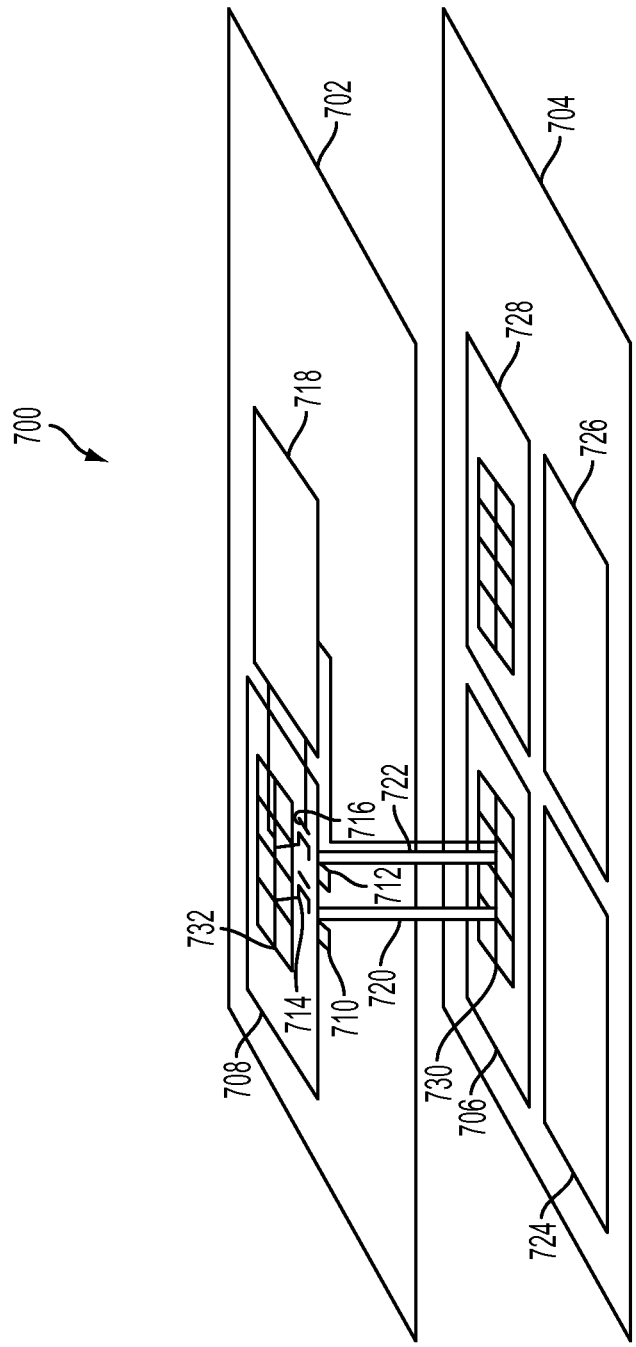

FIG. 7 is a schematic diagram of a device 700 with dynamic power grid sharing according to an embodiment. The device 700 may include memory and/or processing components, such as the active buffered memory described above. As depicted, the device 700 includes a layer 702 including a component 708 and a layer 704 including components 706, 724, 726 and 728. Power is provided at a power supply 710 and a power supply 712, where the power supplies may receive power from separate sources or from the same source, depending on the device 700 configuration. A power grid 730 in the component 706 directs received power to various internal points within the component 706. Similarly, a power grid 732 in the component 708 directs received power to various internal points within the component 708.

In an embodiment, a state of a switch 714 controls a sharing of power between internal points of power grid 732 and power grid 730. When the switch 714 is closed, a power via 720 connects a first internal point within power grid 732 to a second internal point within power grid 730, where the internal points directly share power without connecting all sharing vias of the entire grids 732 and 730. Similarly, a state of a switch 716 controls a sharing of power between internal points of power grid 732 and power grid 730, where switch 716 controls sharing of different internal power grid points than switch 714. When the switch 716 is closed, a power via 720 connects a third internal point within power grid 732 to a fourth internal point within power grid 730, where the internal points are directly sharing power without enabling sharing of other switches of the power grids 728 and 730. The internal point power grid sharing is provided by power vias 720 and 722 coupled to switches 714 and 716, respectively.

In an embodiment, when the switch 714 is closed, power is directed through power via 720 and shared between internal points of the power grids 728 and 730. In an embodiment, when the switch 716 is closed, power is directed through power via 722 and shared between internal points of the power grids 728 and 730. In embodiments, the states of the switches 714 and 716 may be controlled by a controller 718 based on several factors, such as operation modes of the power grids, runtime parameters relating to the power grids, logic in a controller and commands from a system manager (operating system or hypervisor). In an embodiment, the input to the controller is a set of sensors or sensor proxies that indicate the runtime state of the different components (for example, component A and component B) of the device. An input to the controller can, for example, be a critical path delay indication. This delay indication can be used to detect noise on the power grid (e.g., due to a voltage droop). If such noise is detected on the power grid supplying component A but not on the power grid supplying component B, and the management software indicates that component A should be run in a high reliability mode, the controller can decide to share the power grids to reduce the power grid noise for component A thus making it less susceptible to critical path delay timing errors and particle strikes that can cause soft-errors. As depicted, the arrangement for the multi-layered device 700 enables sharing to provide improved connectivity directly between internal points in the power grids 728 and 730 of the stacked chip layers. In one embodiment, sharing between internal points of the power grids 732 and 730 can be controlled individually to deal with a localized emergency, such as voltage droop at an internal point in the grid caused by a sudden onset of high activity in a subset of the component in close proximity to the internal point in the grid, without having to close all sharing switches for the entire power grid, thus saving power by not having to drive all sharing transistors within each power grid. In another embodiment, sharing between internal points of the power grids 728 and 730 can be controlled individually to provide further stability for localized areas with respect to high-frequency noise generated at selected locations in the grids.

Technical effects and benefits include a system that provides improved performance for components dynamically in a device depending upon sensed parameters and/or operation modes for the components.

In an embodiment, a method for dynamically sharing power grids of separate components of a device is provided. In another embodiment, a system including power grids and a controller are configured to perform a method for dynamically sharing power grids is provided. The method includes providing power to a first power grid in a first component; providing power to a second power grid in a second component; determining an operation mode for the first power grid or the second power grid; determining a runtime parameter relating to power provided to the first power grid or relating to power provided to the second power grid; and dynamically controlling a sharing of power between the first power grid and the second power grid based on logic in a controller and at least one of: the determined operation mode and the determined runtime parameter.

In one embodiment, dynamically controlling the sharing of power between the first power grid and the second power grid further comprises dynamically controlling the sharing of power between the first power grid and the second power grid based on commands from a system manager, logic in the controller and at least one of: the operation mode and the runtime parameter.

In one embodiment, dynamically controlling the sharing of power between the first power grid and the second power grid further comprises controlling a state of a first switch that controls sharing of power between the first power grid and the second power grid.

In one embodiment, the method further comprises dynamically controlling a state of a second switch that controls isolation of the first power grid from a first power supply. The method may also further comprise dynamically controlling a state of a third switch that controls isolation of the second power grid from a second power supply.

In one embodiment, determining the runtime parameter comprises determining the runtime parameter by a sensor.

In one embodiment, the operation mode comprises at least one selected from the group consisting of: a turbo mode for the first component supplied by the first power grid, a dynamic voltage scaling for the first power grid, a dynamic frequency scaling for the first component supplied by the first power grid, a noise mode for the first power grid, a dynamic power gating for the first power grid and a reliability mode for the first component supplied by the first power grid; and the second operation mode comprises at least one selected from the group consisting of: a turbo mode for the second component supplied by the second power grid, a dynamic voltage scaling for the second power grid, a dynamic frequency scaling for the second component supplied by the second power grid, a noise mode for the second power grid, a dynamic power gating for the second power grid and a reliability mode for the second component supplied by the second power grid.

In one embodiment, the runtime parameter comprises at least one selected from the group consisting of: a voltage provided to the first power grid, a voltage provided to the second power grid, a temperature of the first component supplied by the first power grid, a temperature of a second component supplied by the second power grid, a critical path delay of the first component, a critical path delay of the second component, a current of the first power grid, a current of the second power grid, a power of the first component, a power of the second component, a soft error rate of the first component, a soft error rate of the second component, a hard error rate of the first component, a hard error rate of the second component, a noise of the first power grid, a noise of the second power grid, an operation frequency of the first component, and an operation frequency of the second component.

In one embodiment, dynamically controlling the sharing of power between the first power grid and the second power grid further comprises controlling the sharing of power between the first power grid located on a first layer of the device and the second power grid located on a second layer of the device.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for dynamically sharing power grids of a memory device, the memory device comprising a memory vault, a memory controller, and a processing element, the method comprising:
   providing power from a first power supply to a first power grid in a first component of the memory device, the first power grid directing power to internal points within the first component, the first component located on at least one of the memory vault, the memory controller, and the processing element;
   providing power from a second power supply to a second power grid in a second component of the memory device the second power grid directing power to internal points within the second component, the second component located on at least one of the memory vault, the memory controller, and the processing element, the second component different than the first component; and
   dynamically changing, by a controller, a state of a first switch that controls a sharing of power between the first power grid and the second power grid during a runtime of the memory device.

2. The method of claim 1, further comprising dynamically changing, by the controller, a state of a second switch that controls isolation of the first power grid from the first power supply.

3. The method of claim 2, further comprising dynamically changing, by the controller, a state of a third switch that controls isolation of the second power grid from the second power supply.

4. The method of claim 1, further comprising:
   determining a first operation mode for the first power grid;
   determining a second operation mode for the second power grid;
   determining a first runtime parameter relating to power provided to the first power grid; and
   determining a second runtime parameter relating to power provided to the second power grid, wherein dynamically changing the state of the first switch that controls the sharing of power between the first power grid and the second power grid comprises dynamically changing the state of the first switch based on at least one selected from the group consisting of: the first operation mode, the second operation mode, the first runtime parameter and the second runtime parameter.

5. The method of claim 4, wherein the first operation mode comprises at least one selected from the group consisting of: a turbo mode for the first component supplied by the first power grid, a dynamic voltage scaling for the first power grid, a dynamic frequency scaling for the first component supplied by the first power grid, a noise mode for the first power grid, a dynamic power gating for the first power grid and a reliability mode for the first component supplied by the first power grid; and
   the second operation mode comprises at least one selected from the group consisting of: a turbo mode for the second component supplied by the second power grid, a dynamic voltage scaling for the second power grid, a dynamic frequency scaling for the second component supplied by the second power grid, a noise mode for the second power grid, a dynamic power gating for the second power grid and a reliability mode for the second component supplied by the second power grid.

6. The method of claim 4, wherein the first and second runtime parameters each comprise at least one selected from the group consisting of: a voltage provided to the first power grid, a voltage provided to the second power grid, a temperature of the first component supplied by the first power grid, a temperature of a second component supplied by the second power grid, a critical path delay of the first component, a critical path delay of the second component, a current of the first power grid, a current of the second power grid, a power of the first component, a power of the second component, a soft error rate of the first component, a soft error rate of the second component, a hard error rate of the first component, a hard error rate of the second component, a noise of the first power grid, a noise of the second power grid, an operation frequency of the first component, and an operation frequency of the second component.

7. The method of claim 4, wherein dynamically changing, by the controller, the state of the first switch that controls sharing of power comprises controlling the state of the first switch that controls sharing of power based on the determined parameter and a logic stored in the controller.

8. The method of claim 4, wherein determining the first runtime parameter comprises determining the first runtime parameter by a first sensor and wherein determining the second runtime parameter comprises determining the second runtime parameter by a second sensor.

9. The method of claim 1, wherein dynamically changing, by the controller, the state of the first switch that controls sharing of power comprises controlling the state of the first switch that controls sharing of power between the first power grid and the second power grid located on a single layer of the memory device.

10. The method of claim 1, wherein dynamically changing, by the controller, the state of the first switch that controls sharing of power comprises controlling the state of the first switch that controls sharing of power between the first power grid located on a first layer of the memory device and the second power grid located on a second layer of the memory device.

11. The method of claim 10, wherein dynamically changing, by the controller, the state of the first switch that controls sharing of power comprises:
   controlling the state of the first switch that connects a first internal point in the first power grid to a second internal point in the second power grid; and
   controlling the state of a second switch that connects a third internal point in the first power grid to a fourth internal point in the second power grid.

12. A method for dynamically sharing power grids of separate components of a memory device, the memory device comprising a memory vault, a memory controller, and a processing element, the method comprising:
   providing power to a first power grid in a first component of the memory device, the first power grid directing power to internal points within the first component, the first component located on at least one of the memory vault, the memory controller, and the processing element;
   providing power to a second power grid in a second component, the second power grid directing power to internal points within the second component, the second component located on at least one of the memory vault, the memory controller, and the processing element, the second component different than the first component;
   determining an operation mode for the first power grid or the second power grid;
   determining a runtime parameter relating to power provided to the first power grid or relating to power provided to the second power grid; and
   dynamically controlling a sharing of power between the first power grid and the second power grid based on logic in a controller and at least one of: the determined operation mode and the determined runtime parameter.

13. The method of claim 12, wherein dynamically controlling the sharing of power between the first power grid and the second power grid further comprises dynamically controlling the sharing of power between the first power grid and the second power grid based on commands from a system manager, logic in the controller and at least one of: the operation mode and the runtime parameter.

14. The method of claim 12, wherein dynamically controlling the sharing of power between the first power grid and the second power grid further comprises controlling a state of a first switch that controls sharing of power between the first power grid and the second power grid.

15. The method of claim 14, further comprising dynamically controlling a state of a second switch that controls isolation of the first power grid from a first power supply.

16. The method of claim 15, further comprising dynamically controlling a state of a third switch that controls isolation of the second power grid from a second power supply.

17. The method of claim 12, wherein determining the runtime parameter comprises determining the runtime parameter by a sensor.

18. The method of claim 12, wherein the operation mode comprises at least one selected from the group consisting of: a turbo mode for the first component supplied by the first power grid, a dynamic voltage scaling for the first power grid, a dynamic frequency scaling for the first component supplied by the first power grid, a noise mode for the first power grid, a dynamic power gating for the first power grid and a reliability mode for the first component supplied by the first power grid; and
   the second operation mode comprises at least one selected from the group consisting of: a turbo mode for the second component supplied by the second power grid, a dynamic voltage scaling for the second power grid, a dynamic frequency scaling for the second component supplied by the second power grid, a noise mode for the second power grid, a dynamic power gating for the second power grid and a reliability mode for the second component supplied by the second power grid.

19. The method of claim 12, wherein the runtime parameter comprises at least one selected from the group consisting of: a voltage provided to the first power grid, a voltage provided to the second power grid, a temperature of the first component supplied by the first power grid, a temperature of a second component supplied by the second power grid, a critical path delay of the first component, a critical path delay of the second component, a current of the first power grid, a current of the second power grid, a power of the first component, a power of the second component, a soft error rate of the first component, a soft error rate of the second component, a hard error rate of the first component, a hard error rate of the second component, a noise of the first power grid, a noise of the second power grid, an operation frequency of the first component, and an operation frequency of the second component.

20. The method of claim 12, wherein dynamically controlling the sharing of power between the first power grid and the second power grid further comprises controlling the sharing of power between the first power grid located on a first layer of the memory device and the second power grid located on a second layer of the memory device.

* * * * *